United States Patent [19]

Reaves, III

[11] Patent Number: 5,225,768
[45] Date of Patent: Jul. 6, 1993

[54] FIELD TEST INSTRUMENT

[75] Inventor: Samuel H. Reaves, III, Stephens City, Va.

[73] Assignee: Mannesmann Aktiengesellschaft, Düsseldorf, Fed. Rep. of Germany

[21] Appl. No.: 850,576

[22] Filed: Mar. 13, 1992

[51] Int. Cl.⁵ .................... H03K 21/30; G07B 13/00
[52] U.S. Cl. .................. 324/76.47; 324/161; 324/76.41; 324/76.55; 324/76.82; 377/29
[58] Field of Search ........................ 331/25; 377/29; 324/83 D, 161, 78 D, 79 R, 79 D

[56] References Cited

U.S. PATENT DOCUMENTS 4,220,996 9/1980 Searcy ................................ 377/29
4,326,173 4/1982 Newman ............................. 331/25
4,513,448 4/1985 Maher ................................. 331/25
4,692,933 9/1987 Wroblewski ........................ 377/29

Primary Examiner—Kenneth A. Wieder
Assistant Examiner—Jose M. Solis
Attorney, Agent, or Firm—Horst M. Kasper

[57] ABSTRACT

A calibration generator for furnishing signals to tachographs, taximeters and other instruments used in fleet management systems. Calibrated frequencies and amplitudes are provided by the generator of the invention. A PLL controlled synthesizer, driven by a crystal oscillator, supplies frequencies under control from the operator. An alternative continuously controlled oscillator is also available for tests.

23 Claims, 5 Drawing Sheets

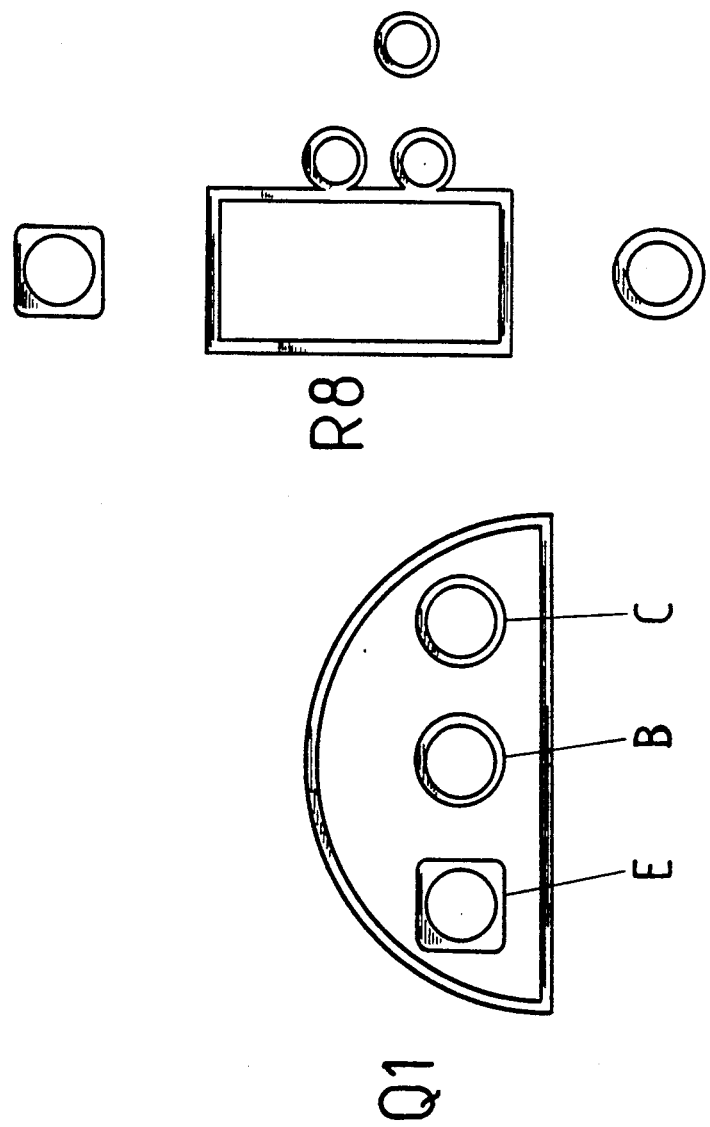

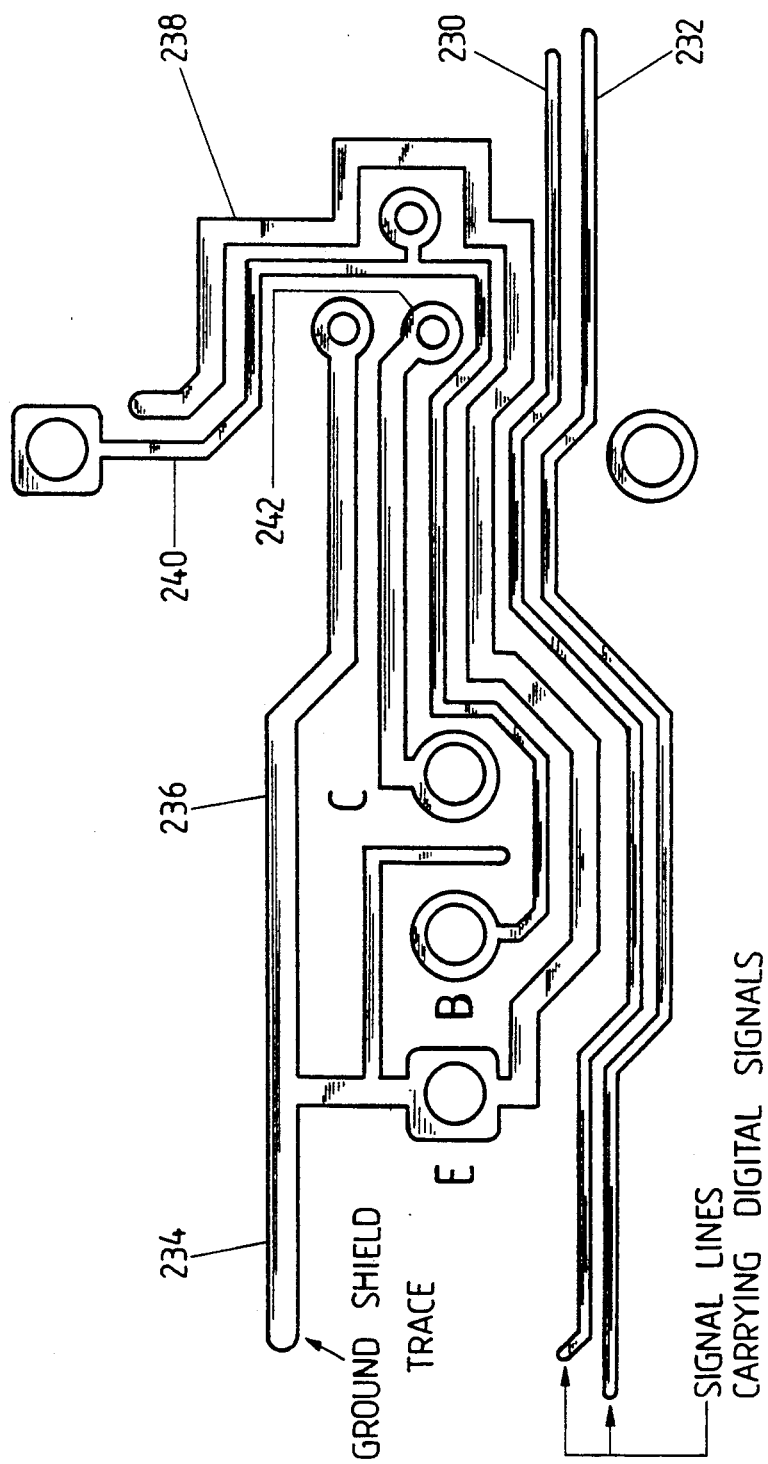

FIELD TEST INSTRUMENT

BACKGROUND OF THE INVENTION

1. Field of the Invention

The invention relates to a test device useful in aiding in the installation and verification of electronic tachographs and fleet management systems and useful as a tool for testing electronic taximeters.

2. Brief Description of the Background of the Invention Including Prior Art

The U.S. Pat. No. 4,021,645 to Saufferer et al. teaches a method and apparatus for determining whether an electronic taximeter is in proper working order. The reference instrument includes a testing switch which is actuated manually by the taxi driver or automatically at the end of a trip. A preselected plurality of parts is applied to the computing means in the electronic taximeter upon activation of the testing switch. If the taximeter is in proper working order, then the reference indicating means of the taximeter will successively display the numerals from 0 to 9 at a rate of about 1 per second.

The reference instrument is an instrument of limited use in regard to a choice display indicating the proper situation or the improper situation. The instrument is not adapted to various working conditions. In particular, it does not provide diagnostic functions about possibilities of malfunctioning. It further does not provide for checking the proper setting of the taximeter with respect to the odometer of the vehicle or of the taximeter calculating apparatus. Furthermore, this instrument does not provide for reading the actual measured parameters nor for use in connection with different types of equipment, such as for example, a fleet management system.

The U.S. Pat. Nos. 3,746,843, 3,426,273, and 3,860,806 also contain background material and show conventional elements of interest in connection with the present invention.

SUMMARY OF THE INVENTION

1. Purposes of the Invention

It is a purpose of the present invention to provide a field testing instrument which is adapted to a plurality of equipment requiring testing metering and employed in commercial vehicles.

It is yet another object of the present invention to provide a structure which provides a capability of performing various test measurements in a self-contained and compact construction.

It is yet a further object of the present invention to provide a testing instrument which provides clear and precise indications of any malfunctioning of vehicle monitoring equipment.

These and other objects and advantages of the present invention will become evident from the description which follows.

2. Brief Description of the Invention

The present invention provides for a testing apparatus. A phase-locked loop signal source has an output. A variable oscillator source has an output. A mode switch has a first terminal connected to the output of the phase-locked loop signal source, a second terminal connected to the variable oscillator source for selecting between the output of the phase-locked loop signal source and the variable oscillator source. An output buffer is connected to the output terminal of the mode switch for connecting to a monitoring device. A variable output buffer is connected to the output terminal of the mode switch for providing a test signal output. A selector switch has a first terminal connected to the output terminal of the mode switch, a second terminal to be connected to an external source, and a third terminal. A pulse and frequency counter is connected with an input terminal to the third terminal of the selector switch. A readout is connected to the pulse and frequency counter.

A reference oscillator can generate a reference signal. A phase comparator can have a first input connected to the reference oscillator, a second input, and an output delivering a direct current output voltage. A voltage controlled oscillator can have an input connected to the output of the phase comparator, and an output connected to the first terminal of the mode switch. A divider can be controlled by a range switch and can have an input connected to the output of the voltage controlled oscillator and an output connected to the second input of the phase comparator.

A variable frequency oscillator can have a control input and an output connected to the second terminal of the mode switch. A potentiometer can be connected to the control input of the variable frequency oscillator.

A pulse/frequency counter module connected to the third terminal of the selector switch can have an output terminal, a reset terminal, and a selector terminal. A second switch can be connected to the selector terminal of the pulse/frequency module for selecting between pulse count and frequency count operation. A display reset switch can be connected to the reset terminal. A counter gating logic can have an input connected to the pulse/frequency counter module, a switch terminal, and an output. A first switch can be connected to the switch terminal for selecting between displaying continuously or holding a display. A precision crystal oscillator and divider circuit can be configured to control the counter gating logic.

An input amplifier can have an input to be connected to an external source or the internal oscillator circuits with the output connected to the second terminal.

Shielding means can shield the input amplifier against interfering electromagnetic signals.

A grounding line can substantially surround the input amplifier for suppression of interference pickup by the input amplifier.

The input amplifier can be provided by a transistor. A first terminal of the transistor can be the base of the transistor and can be connected to the external signal source. A second terminal of the transistor can be connected to ground. Lines connected to the second terminal can substantially surround the first terminal and a third terminal of the transistor. A terminal of the transistor can be connected to lines substantially surrounding two other terminals of the transistor.

The output buffer can be adapted for connection to a vehicle monitoring apparatus.

A potentiometer can have a resistor connected to ground and to the output of the selector switch, and a tap for determining a signal output level. The variable output buffer can be connected to the tap of the potentiometer for providing a test signal output at a desired voltage amplitude level.

A selection switch connected to the output buffer can select a test signal type to be provided to the commercial vehicle monitor.

Status switches connected to the output connector can determine an operational state of a commercial vehicle monitor during testing.

Indicator lamps connected to the output connector can indicate what kind of signals are provided to and from a commercial vehicle monitor.

A multiplier switch connected to the phase locked loop signal source can multiply the frequency provided by the phase-locked loop signal source.

The phase-locked loop signal source, the variable oscillator source, the mode switch, the output buffer, the variable output buffer, the selector switch, and the pulse and frequency counter can be furnished on a printed circuit board.

The invention instrument can be used to calibrate virtually any electronic speedometer or tachometer.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 4 is a detail view of a printed circuit board in the area of the input amplifier of FIG. 3;

FIG. 5 is a view similar to FIG. 4, however including traces of the lines furnished on the printed circuit board.

DESCRIPTION OF INVENTION AND PREFERRED EMBODIMENT

Figure 1:
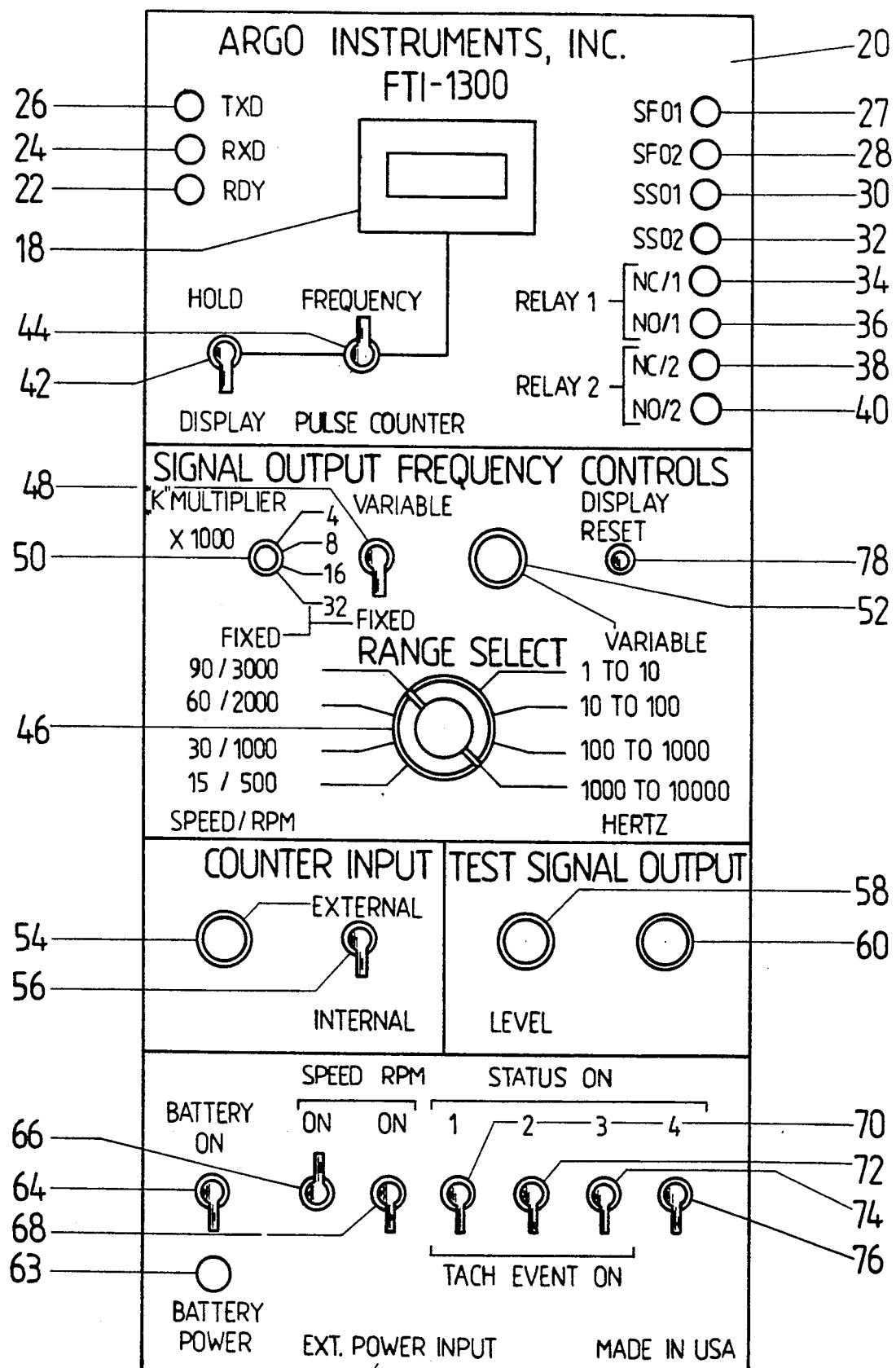
FIG. 1 is a front elevational view of the panel of the test instrument.

The test instrument comprises a front panel generally indicated as 20. The front panel 20 is provided with indicators, which can be light-emitting diode indicators. An indicator 22 indicates that the fleet management system vehicle monitor or FMS vehicle monitor under test is in a known state. An indicator 24 indicates that the FMS monitor under test is receiving data. An indicator 26 indicates that the FMS monitor under test is transmitting data. The indicator SFO1 carrying reference numeral 27 indicates that the first sensor frequency output is furnished. The indicator SF02 carrying reference numeral 28 indicates that a second sensor frequency output is furnished. An indicator 30 carrying the designation SS01 indicates that the first special status connection is provided for controlling a fleet management system FMS. An indicator 32 carrying the designation SS02 is provided for special status determination for fleet management system. First relay indicators 34, 36, and second relay indicators 38 and 40 are also included on the front panel 20.

These status indicators show the status of the computerized vehicle monitor under test. They also can be used to indicate data transfer between a computerized vehicle monitor and another device.

A first switch 42 is provided having two positions, where the first position is a hold position and the second position is a display position of a continuously measured variable on a display 18. The hold position retains a previously measured count value on the display, and the display position provides that the display 18 actively shows current counting frequencies.

A second switch 44 is provided having two positions for measuring, namely a first upper position for frequency measurement and a second lower position for pulse counting. This is useful for using the test apparatus to calibrate a vehicle mileage sending unit to a measured mile.

Having described the upper section of the front panel, now attention is directed to the center section. The center section comprises a range select 46 which switches to the desired operating frequency position. The instrument is furnished with a variable frequency, with a variable oscillator source, and with a fixed phase locked loop oscillator source. The range select 46 can select one of four ranges of frequencies in the case of the variable oscillator or one of four discrete frequencies in the case of the fixed oscillator source. A separate mode switch 48 can be provided to switch between the fixed and the variable operation and/or to switch the connections provided by the range select 46. A "K" multiplier switch 50 is additionally connected to the range select 46 and can multiply the values of the range select 46 either by a factor 1 in the position illustrated, or by a factor of 1, 2, 4 or 8. When the variable mode is selected, potentiometer knob 52 is provided to adjust the frequency to any frequency within the range selected via range switch 46. The display panel is further provided with a reset button 78 which allows to reset the indicator display 18 of the instrument. The display button 78 element provides a reset of the counting of the pulse and frequency counter incorporated in the present invention.

The following section disposed below on the instrument display panel furnishes an input socket 54 for making a connection to an external signal source. A selector switch 56 is disposed next to the input socket 54. The selector switch 56 allows to connect the test instrument to an internal source or to an external source, i.e. in particular to an external source plugged into the socket 54. Furthermore, there is provided an output socket 60 for connecting an output signal furnished by the test instrument. The signal level of the test output provided by the test instrument is adjusted by potentiometer knob 58, disposed neighboring to the output socket 60.

The lower part of the test instrument panel is furnished at the bottom with a socket 62 allowing a connection for hooking into battery power delivered by a cigarette lighter socket power cord or an alternative A.C. to D.C. transformer for benchtop use. A switch 64 is furnished for allowing a switching on and switching off of the internal battery of the test instrument. Furthermore, selection switches 66, 68 are provided, namely for selecting first that the speed output pulses are enabled to the system under test and, second, that rpm pulses are enabled. These switches may be operated independently.

There are provided four status switches 70, 72, 74, and 76. Each status switch, when turned on, is capable of providing test voltage for the test line to be connected to a tachograph, to a fleet management system, or to other equipment used in controlling and/or monitoring a commercial vehicle operation.

The status switches 70, 72, 74, 76 can, for example, be provided with voltages such as +12-volt, +24-volt, and zero volts (ground) depending on the activity desired to be initiated by such status switch. These status switches can be connected to the connector, such as DB-25, to a particular line so that an appropriate action can be initiated in the commercial vehicle monitor.

The status switches provide either a contact closure to ground or a contact closure to +12 or +24 volts, depending on the supply voltage. These switches are also used to simulate up to three tachograph event inputs.

The invention instrument may be powered by one of the following sources:

A. Internal 9-volt D.C. supply, wherein a flashing LED 63 warns the operator of battery in use. The batter power is available to power the unit's frequency generation and pulse/frequency counting modes. The instrument can employ 6 "AAA" alkaline batteries;

B. External A.C. to D.C. power supply (11 to 26 volts D.C.);

C. Via +8-volt power drawn from a tachograph or a fleet management system, such as Model FMS-1332 vehicle monitor furnished by ARGO Instruments. In general, cables are wired to take power from the unit under test;

D. Cigarette lighter plug connection.

Thus, there is provided a test instrument which furnishes all settings on the front panel, which indicate the various modes of operation and the activities of the tested equipment, and which employs a single connector suitable for connection to various commercial vehicle monitoring apparatuses as desired.

Figure 2:
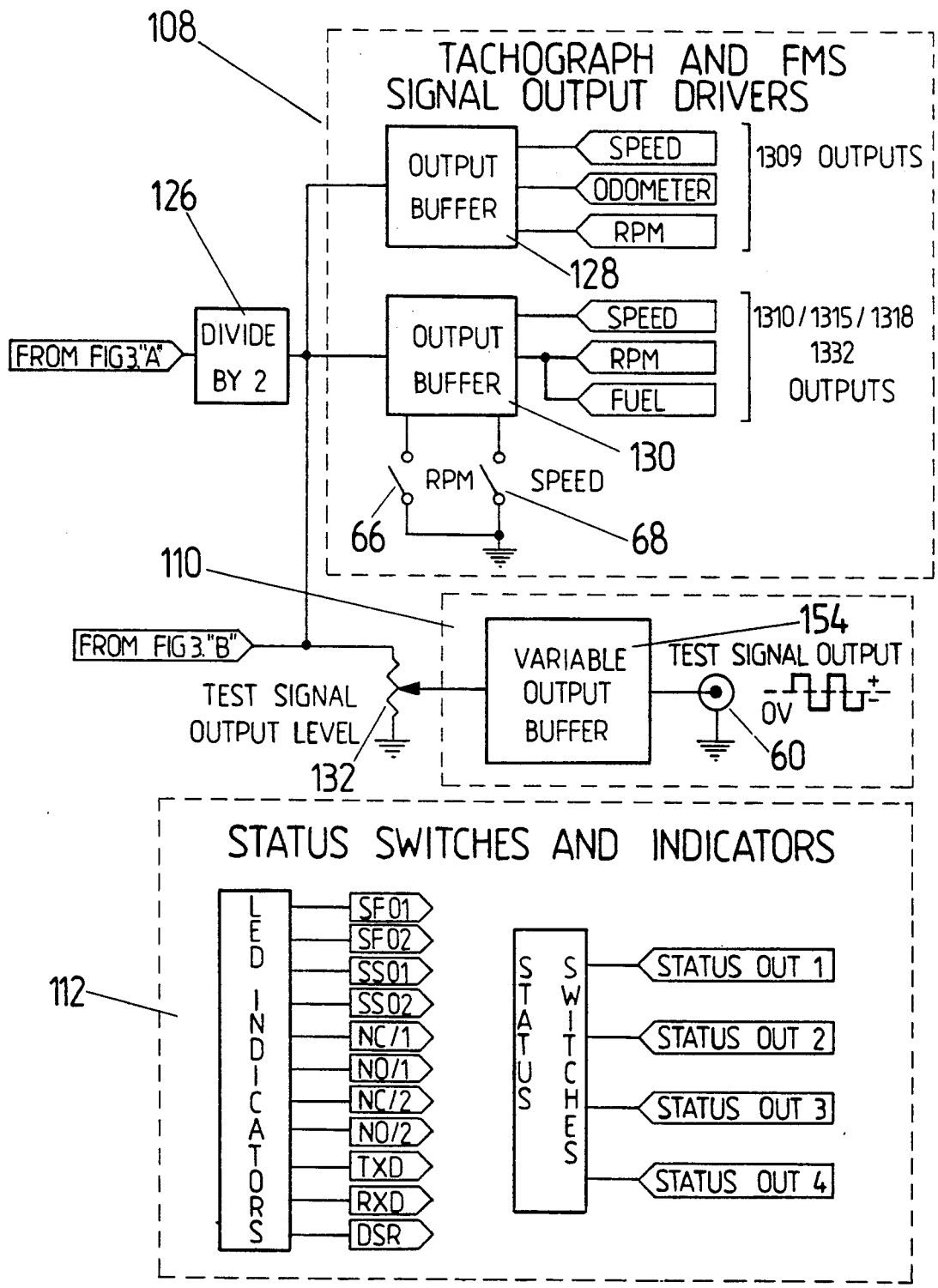
FIG. 2 is a view of a block circuit diagram indicating a first part of the various circuit elements and their mutual connections.
Figure 3:
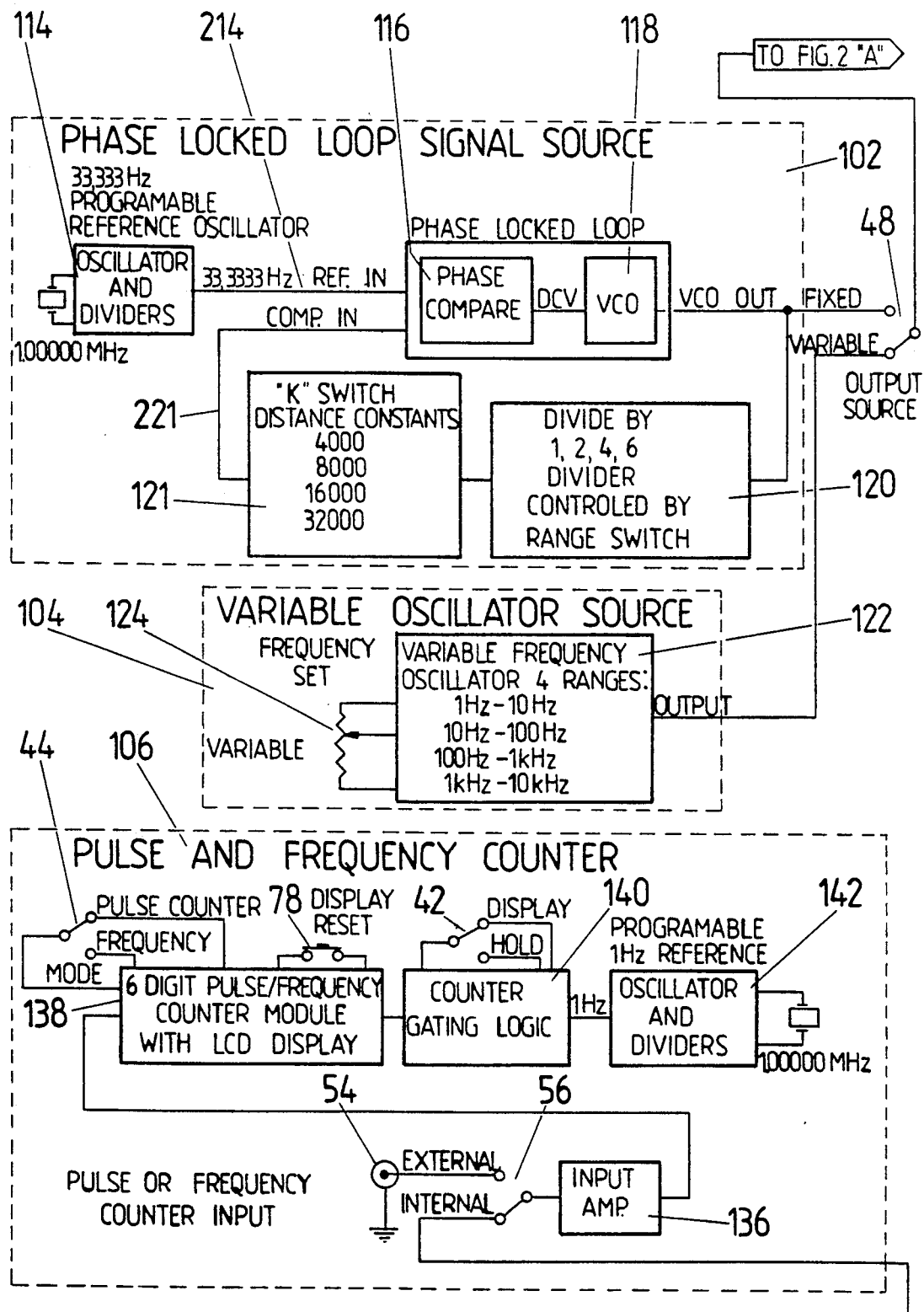
FIG. 3 is a view of a block circuit diagram indicating a second part of the various circuit elements and their mutual connections.

The operational components of the invention test instrument are illustrated in FIGS. 2 and 3. The main sections comprise a phase locked loop signal source 102, a variable oscillator source 104, and a pulse and frequency counter 106, as illustrated in FIG. 3, as well as signal output drivers 108 for a tachograph and fleet management system or other vehicle monitoring apparatus, a variable output buffer system 110, and a system of status switches and indicators 112, as illustrated in FIG. 2.

The system comprises a phase locked loop signal source 102 providing fixed frequencies and a variable oscillator source 104 providing variable frequencies. The fixed frequencies are based on a highly stable and definable oscillator source such as, for example, a quartz crystal, and allows precise settings and measurements for calibration purposes. The variable frequency oscillator source 104 is useful, since the frequencies of the variable frequency oscillator 122 can be accurately measured by the built-in frequency counter whose time base is also controlled by a quartz crystal oscillator. The variable frequency oscillator 122 provides values in between those which are achieved by the fixed frequency oscillator 114.

The phase locked loop signal source 102 comprises an oscillator and divider system 114. Such oscillator and divider system 114 can be provided, for example, by the Epson SPG-8640 series of programmable integrated circuit pulse generators. The operation of this module is described in the Epson SPG series application data sheets. The output of this oscillator and divider system is programmed via hardware to output 33.333 Hz and becomes the reference for the phase locked loop signal source.

The output of the oscillator and divider system 114 is fed to a phase locked loop comprising a phase comparator 116 and a voltage control oscillator 118. The output of the oscillator and divider system 114 is fed to the phase comparator 116 for comparing with a comparison input depending on the deviation difference between the reference frequency and the input comparator frequency. The phase comparator 116 provides a DC voltage output signal to a voltage control oscillator 118. The voltage control oscillator 118 provides an output signal, wherein part of the output signal is fed back to a divider 120. The divider 120 is controlled by a range switch, such as the range select switch 46 furnished on the front panel of the instrument. The output of the divider 120 is then fed through a multiplier element "K" designated with reference numeral 121. The division ratio of the multiplier element "K" is controlled by the "K" multiplier switch 50 on the front panel. The output of the multiplier element "K" 121 is then fed into the phase comparator 116 for comparison with the reference oscillator signal in the phase comparator 116. The output of the voltage controlled oscillator 118 is further fed to a mode switch 48 which determines what kind of output is desired to be furnished from the test instrument, namely the frequency from the phase locked loop or a variable frequency. Depending on the setting of the mode switch 48, a frequency signal derived from the phase locked loop signal source 102 or frequency signal from the variable oscillator source 104 is employed and utilized as the frequency generation system.

The general construction of the phase locked loop can be furnished according to conventional technology such as taught for example in the book entitled "Phase Locked Techniques" by Floyd M. Gardner, publisher John Wiley Publishing Company, 1966.

The phase locked loop signal source 102 is the heart of the test instrument. This circuit derives highly accurate speed and rpm calibration signals from a 33.333 Hz frequency source. The 33.333 Hz source is developed from an integrated circuit chip that contains a quartz crystal along with a programmable divider circuit. This integrated circuit uses a 1.00000 Mhz crystal to provide the base frequency for the oscillator. The programmable divider has been set to provide the division ratio to supply the required 33.333 Hz. Since this frequency is derived from a quartz crystal, it is a very accurate and stable frequency source. The crystal oscillator circuit is stable to +/−100 ppm (0.01%). This 33.333 Hz is the reference frequency that is used to mathematically derive the desired output frequencies in the fixed (phase locked) mode.

The 33.333 Hz reference frequency is supplied to the phase locked loop (PLL) circuit, comprising phase comparator 116, voltage control oscillator 118, divider 120, and multiplier element "K" 121, where the action is as follows:

The phase locked loop (PLL) circuit has basically two inputs and one output. The first input is the reference input 214. The second input is the comparator input 221. The output is taken from a voltage controlled oscillator 118.

As can be seen from FIG. 3, the phase locked loop block contains a phase comparator 116 whose function is to provide a DC voltage that is proportional to the frequency difference between the reference oscillator 114 and the comparator input. This DC voltage is connected to the input of the voltage control oscillator 118. The frequency of the control oscillator 118 is proportional to the level of the DC voltage furnished by the output of the phase comparator 116.

The desired circuit action is to maintain, i.e. to phase lock, the frequency of the voltage control oscillator 118 to the reference frequency or to some multiple of the reference frequency.

For example, if the output of the voltage control oscillator 118 is connected to the comparator input 221, and a 33.333 Hz reference frequency is connected to the reference input 214, this will force the voltage control oscillator 118 to phase lock to the reference frequency.

If a frequency of 66.666 Hz were desired, a divider 120 (divide by two) can be inserted between the output of the voltage control oscillator 118 and the comparator input 221. Since the phase lock loop comparator action is to move the frequency of the voltage control oscillator 118 to match the reference frequency, it would move the frequency to exactly double that of the reference, since the frequency of the voltage control oscillator 118 is divided by a factor of two before it is applied to the comparator input 221.

Using this example, there are divider circuits that can be switched in via front panel rotary switches to effectively multiply the reference frequency by 1, 2, 4, 6, 8, 12, 16, 32, and 48. These combinations are available by selecting appropriate settings of the range select switch 46 and the "K" multiplier switch 50.

The variable oscillator source 104 can be provided by a NE-555 integrated circuit provided by Signetics Corporation. A detailed operation of this integrated circuit can be found in the Signetics application note 170 of the December 1988 or in the Signetics linear data manual volume 2, issued in 1988. The variable oscillator source 104 is furnished by a variable frequency oscillator 122. The frequency range setting the variable oscillator source 104 can be adjusted by range select switch 46 on the front panel, with the potentiometer knob 52 on the front panel selecting values that fall between the ranges. The potentiometer is designated in FIG. 3 with the reference numeral 124. The output of the variable frequency oscillator 122 is then connected to the output switch 48 selecting between the variable frequency output and the fixed frequency (phased locked) output.

The variable oscillator source 104 is an adjustable frequency source that may be used with the built-in frequency and pulse counter to calibrate instruments that do not fall into one of the fixed frequency ranges. The variable output (test signal output) source can be used as a signal source to substitute for a vehicle speed or rpm sensor.

In both the fixed (phase locked loop) and variable frequency modes, the speed and rpm outputs may be switched on and off independently.

The signal delivered by the variable frequency and fixed frequency output switch 48 is then fed into a divider 126 which divides the frequency by two. The action of the divider 126 is to clean up the output signal of the variable oscillator and to insure a 50% duty cycle. The output of the divider 126 can be furnished to a taximeter, a tachograph, a field management system or alternate commercial vehicle monitoring system. The signal output drivers substantially comprise buffers which are suitable for buffering the signal delivered to and coming from the respective monitoring devices. The first output buffer 128 is connected to the terminals: speed, odometer, and rpm. The outputs of the first output buffer 128 are particularly adapted for a tachograph instrument. The second buffer 130 is connected to a second set of terminals: speed, rpm, and fuel, which second set of terminals is particularly useful for a fleet management system.

The frequencies furnished by the phase locked loop circuit are sent to the tachograph and fleet management system FMS signal output drivers to be connected to the tachograph or computerized vehicle monitor under test.

This range of frequencies allows the fixed frequency source to provide pulses at a quantity of 4000, 8000, 16000, 32000 pulses per mile or kilometer at a rate of 15, 30, 60, 90 mph or km/h. In addition, this pulse rate also provides 500, 1000, 2000, and 3000 rpm. All of these outputs are used to calibrate vehicular tachometers and speedometers. In addition, the unit may be used to check taximeters.

The output of the divider 126 is further connected via a potentiometer 132 to ground. The potentiometer 132 determines the output level and this potentiometer 132 can be adjusted by the potentiometer knob 58 on the front panel of the test instrument. A variable output buffer 154 is connected to the variable pick up on the potentiometer 132. The output of the variable output buffer 154 is then connected to the output socket 60. The output socket 60 is preferably a coaxial shielded socket.

The output of the divider 126 is further connected to the pulse and frequency counter 106. The pulse and frequency counter 106 is operated by the input signal source selector switch 56 which can be either connected to the internal signal, provided at the output of the divider 126, or to an external signal. The external signal can be fed into the input socket 54 and from the input socket 54 to an input amplifier 136. The input amplifier 136 can be a class "A" transistor amplifier followed by a comparator. The output of the input amplifier 136 is then fed to the second terminal of the input signal source selector switch 56.

The input for the frequency and for the pulse and frequency counter 106 as selected by the input signal source selector switch 56 is then fed to a six-digit pulse/frequency counter module 138. This six-digit pulse/frequency counter module 138 can be set to alternating operating modes, namely a pulse counting mode and a frequency counting mode. This setting of the mode of the six-digit pulse/frequency counter module 138 is furnished by the frequency/pulse count switch 44 connected to the six-digit pulse/frequency counter module 138. The numerical count is displayed on the liquid crystal display 18 on the front panel of the instrument.

Furthermore, the six-digit pulse/frequency counter module 138 can be reset by the display reset button 78. Operating this button 78 resets the counter module 138 and starts a new counting operation.

The actual counting is controlled by counter gating logic 140. The operation of the counter gating logic 140 is such that a gate is opened for an input source signal to enter. Then, the frequency or the pulses are counted for a certain counting time, such as one second, for determining the received number of count events during the defined time period. A latch gate is opened after the counting time has elapsed and the respective count signal is furnished. The switch 42 can set the counter to a counting and display state and to a holding state. The output of the counter gating logic 140 is fed at the frequency of, for example, 1 Hz, to an oscillator and divider circuit 142. The oscillator and divider circuit 142 can be provided by the same Epson SPG-8640BN crystal controlled integrated circuit pulse generator module programmed via hardware to provide the 1 Hz time base as it was described above in connection with the oscillator and divider 114. The frequency of this reference oscillator for divider circuit 142 is provided by a 1 Mhz quartz crystal.

Thus, the counter gating logic 140 provides a 1 Hz window to open and close, thereby defining a time period during which the counting takes place. The counter gating logic 140 provides the proper control timing so that the pulse/frequency module 138 will display the frequency in Hertz.

It is important in connection with the invention instrument that the interference between the various signals be limited in order to avoid erroneous operation of the instrument. It has been found that the input amplifier 136 is particularly sensitive to interaction with the signals internally generated in the test instrument. FIG. 4 shows the general layout of the transistor Q1 representing the input amplifier 136. The emitter connector of the transistor Q1 is designated with E, the respective collector with C, and the respective base with B. The resistor R8 is disposed neighboring the transistor Q1 on the printed circuit board.

FIG. 5 shows then on the component side traces of the connections of the printed circuit board. The lines 230 and 232 represent signal lines carrying digital signals. The base B of the transistor Q1 is connected to ground via line 234. Additional grounding lines 236 and 238 are provided. The grounding lines 236 and 238 enclose the mounting area of the transistor Q1 and shield the connectors of the transistor Q1 relative to the signal lines 230 and 232. This is achieved by looping the grounding lines 236 and 238 around the connector line 240 of the base B and the connector line 242 of the collector C substantially up to the area, where these connector lines 240 and 242 are connected to devices. The shielding lines 236 and 238 extend preferably along and in parallel to lines emanating from the input amplifier 136 on the printed circuit board. The shielding lines 236 and 238 are preferably disposed between the terminals of the input amplifier transistor and any signal lines in the neighborhood of the input amplifier transistor. The shielding of the grounding lines 236 and 238 extends at least for the total distance of the emitter connector E to the collector (connector) C of the transistor Q1 on the printed circuit board in the direction of the connector lines 240 and 242 as measured from the point of the collector C. This isolates lines carrying digital signals 230, 232 from the input amplifier transistor used in the pulse and frequency counter 106.

The pulse counter of the test instrument will count pulses from 1 pulse to 999,999 pulses. This pulse counter has the sensitivity required to count directly from the vehicle's magnetic sensor. The pulse count mode has a display hold feature to aid in vehicle calibrations.

The frequency counter of the test instrument has a range of 1 Hz to over 20 Khz. This frequency counter has a quartz crystal controlled time base.

The pulse and frequency counter 106 may be used to either verify the frequency output of the phase locked loop (PLL) fixed mode or as an aid in adjusting the variable oscillator source 104. The pulse and frequency counter 106 has two modes: frequency measurement and pulse count. When in the pulse count mode, the pulse count may be reset with the reset push button 78. Placing the switch 42 into the hold position will freeze the count in the display 18 at any time. When in the frequency measurement mode, the unit reads frequency directly in Hz. The time-base oscillator is of the same type quartz crystal oscillator that is used for the phase locked loop (PLL) reference.

The present test instrument combines the functions of various desired operations in a single instrument. This combined availability of the various testing signals substantially simplifies the operation of field testing of commercial vehicle monitors such as tachographs, field management systems, taximeters, and the like.

The front panel of the present instrument provides switches and a full display of all desirable information for obtaining all desirable modes by a simple selection operation. The status of the operation of the instrument is further clearly indicated by light-emitting diodes. The tachograph and field management system signal output drivers can be connected by a DB25 connector using specifically assigned lines to the various monitoring apparatuses which can be provided in a vehicle.

The instrument is contained in a high impact 30% glass-reinforced nylon (polyamide) plastic housing. The text overlay instrument panel is made from GE LEXAN polycarbonate plastic, with the nomenclature silkscreened on the underside, making the text impervious to wear.

The operating temperature range of the test instrument is between −20 to +70 degrees Celsius.

When using a variety of test cables, the speed and rpm outputs can be individually turned on and off to check the full span operation of a tachograph under test. When the rpm switch is operated, the fuel representing output can be controlled.

When the instrument is used in conjunction with a fleet management system vehicle monitor and the proper format has been loaded to the monitor, the relay outputs may be tested. The instrument provides status LEDs that will indicate the condition of the relay contacts.

A tachograph comprises the advantage in connection with monitoring an operation of a commercial vehicle in that it provides a chart which shows the events which have occurred and which are particularly relevant. Such tachograph, for example, can show the speed of a vehicle, the engine rotation per minute. Furthermore, for example, police officer activities, operation of a siren, operation of a flashing light and the like can be recorded. Furthermore, the recording chart of a tachograph is of legal significance as evidence.

The fleet management system FMS does not record on a chart but records similar signals in a memory storage. The signals recorded in the memory storage can be downloaded and then be printed out on a printer. However, the legal significance of the records obtained by the fleet management system is of a lesser value because of the existing possibilities of unauthorized manipulation of such fleet management systems.

The operation of the test instrument in connection with the various metering equipment is such that a signal input connector is provided at the test instrument, for example, a DB25 connector. Then, various cables can be provided for connecting this test instrument to the particular monitor of interest to be calibrated and monitored by the test instrument. For example, one cable can be used to connect the test instrument to a tachograph, and a second cable can be used to connect the test instrument to a fleet management system.

When used with the fleet management system direct extraction terminal, the instrument's communication status LEDs 112 show the state of the fleet management system monitor "receive/transmit" and "data ready" data lines. This can aid in trouble shooting communication problems between monitor and external devices.

The invention field test instrument is associated with the advantage that it provides frequencies that are set up in ranges adapted for monitoring tachographs and taximeters. The test instrument also combines in one instrument the capability to service electronic fleet management products. It combines the following instrument features:

1. phase locked loop signal generator,
2. variable frequency oscillator,
3. pulse counter,
4. frequency counter,
5. sensor simulation,
6. status input simulation,
7. status indicators,
8. data indicators.

The invention instrument has the following capabilities:

As a signal source, the instrument can provide accurate test signals to verify the calibration of tachographs. A precise quartz crystal oscillator is used to produce the frequencies at 4000, 8000, 16000 and 32000 pulses per mile/km at speeds of 15, 30, 60, 90 mph or km/h and also rpm at 500, 1000, 2000, 3000.

In addition to the fixed amplitude outputs, a variable level output is available to test the sensitivity of pulse dividers and frequency convertors and other accessory equipment.

A variable frequency source is provided in four ranges to cover 1 Hz to 10,000 Hz and allows the unit to substitute for a magnetic sensor or sending unit. The wide frequency range allows the instrument to provide signals that can be adjusted to virtually any corresponding pulses per mile/km. This feature allows the user to verify the tachograph/monitor under test at the vehicles calibration.

The invention instrument is a test device and is of particular use by aiding in the installation and verification of electronic tachographs and fleet management system FMS vehicle monitors, in particular e.g. the 1300 series produced by ARGO Instruments. In addition the invention instrument can be used to calibrate virtually any electronic speedometer or tachometer. The invention instrument further serves as a tool for testing electronic taximeters.

In addition to the signal generation and frequency/pulse counter modes, the instrument provides the additional enhancements for tachograph and fleet management system testing:

Four status switches 70, 72, 74, 76 are provided to test the status inputs of vehicle monitors. Three of these status switches can be used to test tachograph events if an external 12-volt through 24-volt source is provided to the instrument via a cigarette lighter plug or other means.

It will be understood that each of the elements described above, or two or more together, may also find a useful application in other types test instruments differing from the types described above.

While the invention has been illustrated and described as embodied in the context of a field test instrument with a phase locked loop signal source, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A testing apparatus comprising
    a phase-locked loop signal source having an output;
    a variable oscillator source having an output;
    a mode switch having a first terminal connected to the output of the phase-lock loop signal source, and having a second terminal connected to the variable oscillator source for selecting between the output of the phase-locked loop signal source and the variable oscillator source, and having an output terminal;
    an output buffer receiving a signal derived from the output terminal of the mode switch for connecting to a monitoring device;
    a variable output buffer receiving a signal derived from the output terminal of the mode switch for providing a test signal output;
    a selector switch having a first terminal connected to the output terminal of the mode switch, having a second terminal to be connected to an external source, and having a third terminal;
    a pulse and frequency counter connected to the third terminal of the selector switch;
    a readout connected to the pulse and frequency counter.

2. The testing apparatus according to claim 1, wherein the phase-locked loop signal source includes
    a reference oscillator generating a reference signal;
    a phase comparator having a first input connected to the reference oscillator, having a second input, and having an output delivering a direct current output voltage;
    a voltage controlled oscillator having an input connected to the output of the phase comparator, and having an output connected to the first terminal of the mode switch;
    a range switch;
    a divider controlled by the range switch and having an input connected to the output of the voltage controlled oscillator and having an output connected to the second input of the phase comparator.

3. The testing apparatus according to claim 1, wherein the variable oscillator source includes
    a variable frequency oscillator having a control input and having an output connected to the second terminal of the mode switch;
    a potentiometer connected to the control input of the variable frequency oscillator.

4. The testing apparatus according to claim 1, wherein the pulse and frequency counter includes a pulse/frequency counter module connected to the third terminal of the selector switch, and having an output terminal, having a reset terminal, and having a selector terminal;

a second switch connected to the selector terminal of the pulse/frequency module for selecting between pulse count and frequency count operation;

a display reset switch connected to the reset terminal;

a counter gating logic having an input connected to the pulse/frequency counter module, having a switch terminal, and having an output;

a first switch connected to the switch terminal for selecting between displaying continuously or holding a display;

a precision crystal oscillator and divider circuit configured to control the counter gating logic.

5. The testing apparatus according to claim 1, further comprising
an input amplifier having an input to be connected to an external source, and having an output connected to the second terminal.

6. The testing apparatus according to claim 1, further comprising
an input amplifier having an input to be connected to the variable oscillator source, and having an output connected to the second terminal.

7. The testing apparatus according to claim 2, further comprising
an input amplifier having an input to be connected to the reference oscillator, and having an output connected to the second terminal.

8. The testing apparatus according to claim 5, further comprising
shielding means for shielding the input amplifier against interfering electromagnetic signals.

9. The testing apparatus according to claim 5, further comprising
a grounding line substantially surrounding the input amplifier for suppression of interference pickup by the input amplifier.

10. The testing apparatus according to claim 5, wherein the input amplifier is provided by a transistor, wherein a first terminal of the transistor is the base of the transistor and is to be connected to the external signal source, wherein a second terminal of the transistor is connected to ground, and wherein lines connected to the second terminal substantially surround the first terminal and a third terminal of the transistor.

11. The testing apparatus according to claim 5, wherein the input amplifier is provided by a transistor, wherein a terminal of the transistor is connected to lines substantially surrounding two other terminals of the transistor.

12. The testing apparatus according to claim 1, further comprising
a voltage divider having an input connected to the output of the selector switch, and having an output connected to the output buffer.

13. The testing apparatus according to claim 1, wherein the output buffer is adapted for connection to a vehicle monitoring apparatus.

14. The testing apparatus according to claim 1, further comprising
a potentiometer having a resistor connected to ground and to the output of the selector switch, and having a tap for determining a signal output level, wherein the variable output buffer is connected to the tap of the potentiometer for providing a test signal output at a desired voltage amplitude level.

15. The testing apparatus according to claim 1, further comprising
a selection switch connected to the output buffer for selecting a test signal type to be provided to a commercial vehicle monitor.

16. The testing apparatus according to claim 1, further comprising
status switches connected to the output buffer for determining an operational state of a commercial vehicle monitor during testing.

17. The testing apparatus according to claim 1, further comprising
indicator lamps connected to the output buffer for indicating the kind of signals provided to and from a commercial vehicle monitor.

18. The testing apparatus according to claim 1, further comprising
a multiplier switch connected to the phase locked loop signal source for multiplying the frequency provided by the phase-locked loop signal source.

19. The testing apparatus according to claim 1, further comprising
a printed circuit board, wherein the phase-locked loop signal source, the variable oscillator source, the mode switch, the output buffer, the variable output buffer, the selector switch, and the pulse and frequency counter are furnished on the printed circuit board.

20. The testing apparatus according to claim 1, further comprising
a pulse and frequency counter having an input and connected with an input amplifier having an output connected to the third terminal of the selector switch, wherein the output of the input amplifier is connected to the input of the pulse and frequency counter, said input amplifier having an input connected to the third terminal of the selector switch;
a readout connected to the pulse and frequency counter.

21. The testing apparatus according to claim 20, further comprising
an input jack connected to the first terminal of a selector switch allowing a selection of an external source of pulses or frequency;
wherein the second terminal of the selector switch for selecting the pulse and frequency source is either phase locked or variable internal to the apparatus.

22. The testing apparatus according to claim 20, further comprising
an input amplifier, wherein the third terminal is connected to the input amplifier, and wherein the output of the input amplifier is connected to the input of the pulse and frequency counters.

23. The testing apparatus according to claim 20, further comprising
a readout display connected to the pulse and frequency counters.

* * * * *